April 28, 1931.  H. A. HICKS  1,803,018
AIRPLANE FUSELAGE CONSTRUCTION
Filed June 11, 1930
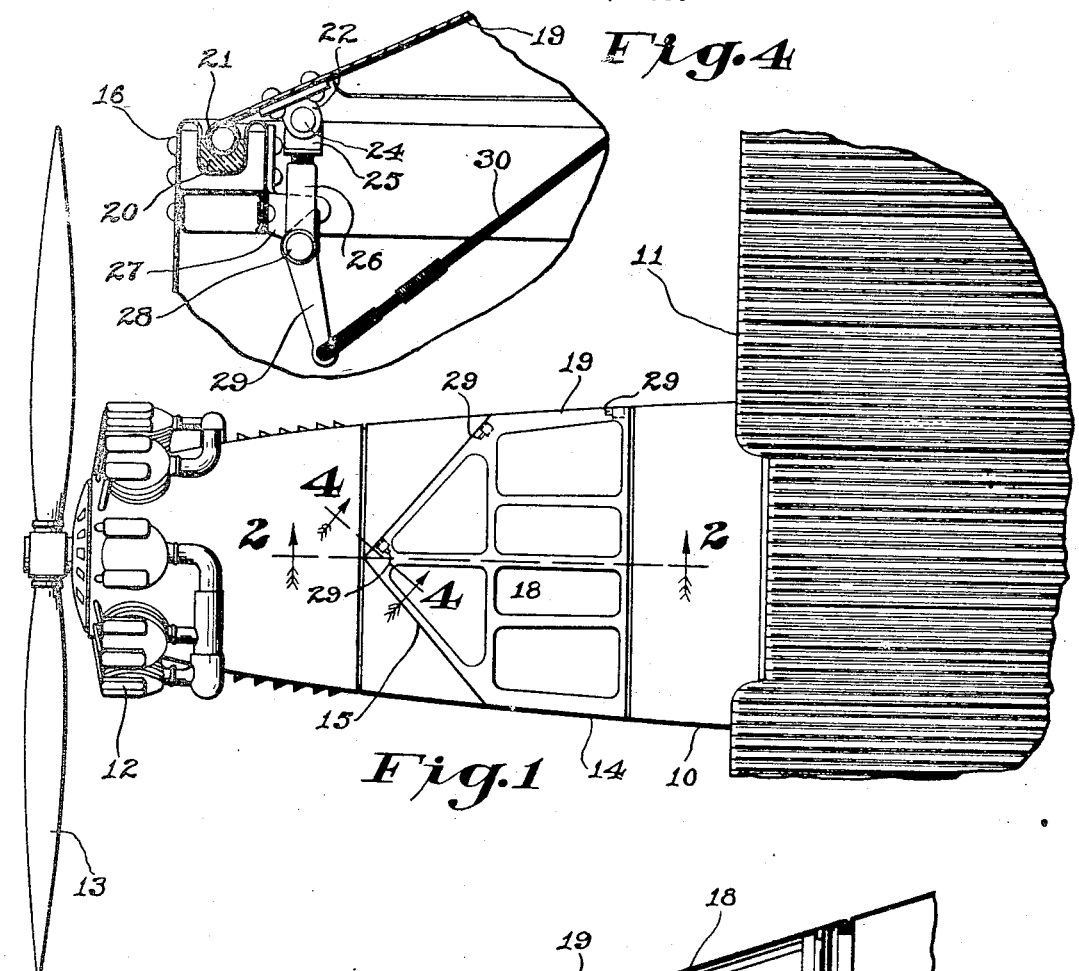
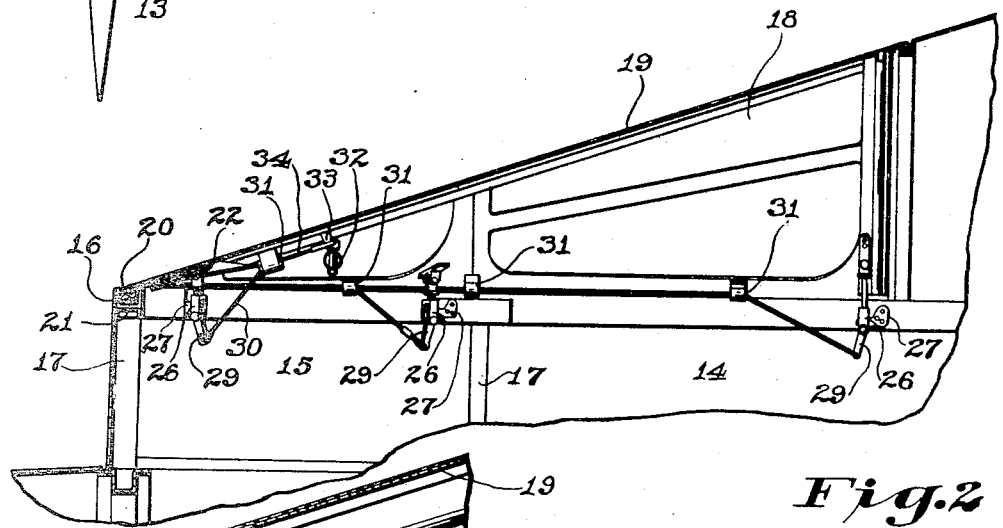
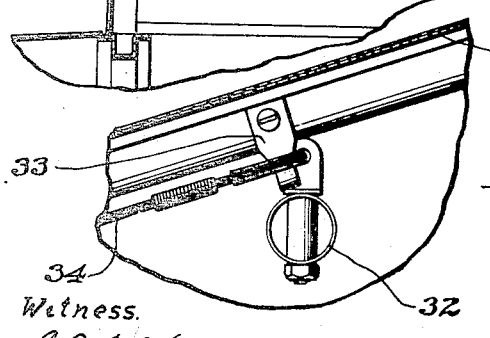
INVENTOR.
H. A. Hicks.
BY
E. L. Davis
ATTORNEY.
Witness.
C. C. McRae Patented Apr. 28, 1931

1,803,018

UNITED STATES PATENT OFFICE

HAROLD A. HICKS, OF DETROIT, MICHIGAN, ASSIGNOR TO FORD MOTOR COMPANY, OF DEARBORN, MICHIGAN, A CORPORATION OF DELAWARE

AIRPLANE-FUSELAGE CONSTRUCTION

Application filed June 11, 1930. Serial No. 460,346.

The object of my invention is to provide a cabin type airplane fuselage having a removable roof portion over the pilot's cockpit for the purpose of which is to provide an exit for the pilot if the ordinary door of the fuselage cannot be reached in case of an accident. It sometimes happens that the pilot of the plane is forced to abandon it in the air. This may be due to the exhausting of the fuel where there is no landing field or area upon which a possible safe landing of the plane could be accomplished. Further, it sometimes happens that the pilot will lose his course because of poor or no visibility. Snow storms are especially dangerous to fly through for this reason. When such an occurrence happens in mountainous territory the pilot may desire to abandon the plane in the air rather than run the risk of colliding into the side of a mountain. With my improved structure the pilot may, by one simple operation, disengage simultaneously a plurality of roof hold down clamps so that the removable roof portion will be drawn off the fuselage thereby giving the pilot a means of escape from the cabin.

A further object of my invention is to provide a channel extending around the upper edge of the airplane fuselage adjacent to the pilot's cockpit in which a sponge rubber insert is fitted. The edges of the removable roof portion bear against this rubber to thereby insure a water tight joint between the fuselage and the roof during normal operation of the plane.

Still a further object of my invention is to provide a plurality of novel clamping devices spaced around the removable roof portion which are simultaneously operated by the pilot in case he desires to remove this portion of the roof. Simple, positive, and light weight clamping devices are provided which are operated together by a single act of the pilot thereby releasing the roof portion in only a second or two of time.

It also happens that equipment is sometimes desired in the plane which could not be inserted through the cabin door. Should this occasion arise, my removable roof portion may be removed to give greater access to the fuselage.

With these and other objects in view my invention consists in the arrangement, construction and combination of the various parts of my improved device, as described in the specification, claimed in my claim, and illustrated in the accompanying drawings, in which:

Figure 1 shows a top view of the forward portion of an airplane fuselage having my improved removable cockpit roof installed thereon.

Figure 2 shows a sectional view taken on the line 2—2 of Figure 1.

Figure 3 shows an enlarged portion of the sectional view shown in Figure 2, illustrating the means for holding the operating mechanism in an accessible position, and Figure 4 shows a sectional view taken on the line 4—4 of Figure 1, illustrating in detail one of my improved hold down clamps.

Referring to the accompanying drawings, I have used the reference numeral 10 to indicate generally a fuselage of an airplane having a pair of wings 11, motor 12 and propeller 13. The motor 12 is secured directly to the forward end of the fuselage 10 in the ordinary manner. That portion of the fuselage directly to the rear of the motor 12 and forwardly of the wings 11 is partitioned off for a pilot's cockpit. The upper part of this pilot's cockpit is provided with side windows 14 and a front V-shaped windshield 15.

An upwardly opening channel 16 extends around the top edge of the windows 14 and windshield 15 to form a frame for these members and is supported in this position by pillars 17. The pilot is thus able to see on each side and in front of the plane. The pilot's cockpit is provided with a removable roof portion consisting of a plurality of windows 18 secured in a frame member 19, the edges of which frame are rolled into a bead 21 which projects into the channel 16. I have provided a sponge rubber strip 20 disposed in the channel 16 so that the bead 21 may coact with this rubber to form a water tight joint between the roof portion and the sides of the fuselage.

I have provided six hold down clamps spaced around the edge of the frame 19 which co-act with the upper edge of the fuselage to detachably secure the roof portion over the cockpit. All of these clamps are simultaneously released by the actuation of a single handle so that only a very simple and short operation on the part of the pilot is required.

Referring to Figure 3, I have shown a detailed view of one of my improved hold down clamps. Each of these clamps consist of a clevis fitting 22 secured to the edge of the frame 19. A pin 24 extends through this fitting to pivotally mount the adjustable upper end of a clevis 25. The lower end of this clevis is forked so that it may act as a catch 27 which is secured to the fuselage. Six of these catches 27 are riveted to the inside of the channel member 16 adjacent to the clevises 26. The lower ends of the clevises are provided with pins 28 upon which levers 29 are rotatably mounted between the arms of the clevises. The upper end of each lever 29 has a wedge shape form which co-acts with the catch 27 so that movement of the lever to position aligned with the clevis 26 will draw the clevis into its locked position. The point of contact between the lever and the catch passes through the centerline connecting the pins 24 and 28 thereby retaining the clamp indefinitely in the locked position.

The lower end of the lever 29 has a cable 30 secured thereto so that when this cable is pulled it will swing the lever 29 around the pin 28 thereby releasing the clevis 26 so that further movement of the cable will draw the clevis up against the bottom of the roof. Each of the cables 30, from the respective clamps, are spliced to a main cable 34 which extends around the edge of the roof member and which is guided by suitable bushings 31. The center portion of the cable 34 has a handle 32 secured thereto which is arranged to hang from the top of the roof 19, being fastened thereto by a spring clip 33.

When the operator desires to release the roof member he simply pulls the handle 32 which simultaneously releases all of the hold down clamps thereby allowing the detachable portion of the roof to be drawn off by the action of the engine slip stream. The high velocity of the air adjacent to the outer surface of this roof member causes a partial vacuum which lifts the cover clear of the fuselage when the clamps are released.

It will be understood that when this device is used in the case of an emergency, the subsequent destruction of the roof member is of no particular importance.

Among the many advantages arising from the use of my improved device, it may be well to mention that I have provided a novel clamping mechanism for securing the roof to the top of the fuselage and one which may be operated to almost instantly detach the roof member. Further, my channel member which extends around the top edge of the fuselage and in which a sponge rubber strip is disposed co-acts with the edge of the roof member to form a water tight joint therebetween.

Some changes may be made in the arrangement, construction, and combination of the various parts of my improved device without departing from the spirit of my invention, and it is my intention to cover by my claim, such changes as may reasonably be included within the scope thereof.

I claim as my invention:

In an airplane, a cabin type fuselage having a pilot's cockpit disposed in the forward portion thereof, a relatively light weight roof disposed over said cockpit, the edges of which co-act with the upper edges of the cockpit to form a water-tight joint, a plurality of quickly detachable clamps spaced around the periphery of said roof and secured thereto in position to co-act with the edges of the cockpit to thereby secure the roof thereon, and an operating cable common for all of said clamps secured to said roof, whereby the clamps may be instantly and simultaneously released to quickly detach the roof, said roof being so shaped that the velocity of the slip stream will draw the roof upwardly away from the fuselage when detached and the clamps and operating cable being secured to the roof will likewise be drawn free from the cabin to thereby provide a free and clear opening above the pilot's cockpit.

HAROLD A. HICKS.